April 23, 1968      C. J. MILLER      3,378,914

FLUXLESS ALUMINUM BRAZING

Filed Aug. 8, 1966      2 Sheets-Sheet 1

INVENTOR.
CLARENCE J. MILLER
BY Henry W. Kaufmann

AGENT

April 23, 1968     C. J. MILLER     3,378,914

FLUXLESS ALUMINUM BRAZING

Filed Aug. 8, 1966     2 Sheets-Sheet 2

INVENTOR.
CLARENCE J. MILLER

BY *Henry W. Kaufmann*

AGENT

United States Patent Office 3,378,914
Patented Apr. 23, 1968

3,378,914
FLUXLESS ALUMINUM BRAZING
Clarence John Miller, Paoli, Pa., assignor to General Electric Company, a corporation of New York
Continuation-in-part of application Ser. No. 477,566, Aug. 5, 1965. This application Aug. 8, 1966, Ser. No. 573,774
9 Claims. (Cl. 29—494)

ABSTRACT OF THE DISCLOSURE

Aluminum-base alloy parts are assembled, with an aluminum brazing material of lower melting point than that of the parts at the interfaces where joints are to be brazed; the assembly is heated in inert gas at atmospheric pressure or above, while magnesium vapor is provided in the vicinity of the interfaces. Temperature above melting point of brazing material and below that of parts is maintained long enough for magnesium vapor to permit brazing material to wet and join parts.

---

This invention pertains to the art of brazing and more particularly to the art of brazing materials of high aluminum content at atmospheric pressure.

This application is a continuation-in-part of my copending application Ser. No. 477,566, entitled, Fluxless Aluminum Brazing, filed Aug. 5, 1965, now abandoned.

In my copending application Ser. No. 163,922, filed Jan. 2, 1962, entitled, Aluminum Brazing, now U.S. Patent 3,321,828, I teach the brazing of metal parts of high aluminum content in vacuo without a flux, by exposing the parts to be brazed to the action of magnesium vapor. At the time of making that invention I was concerned with a specific problem having to do with the brazing of certain materials of high aluminum content in a vacuum furnace. In particular, since I knew that the vapor pressure of magnesium at the temperatures required to melt ordinary aluminum brazing materials, such as aluminum-silicon alloys, was considerably less than one atmosphere, I assumed that it was necessary to have the ambient pressure of gas around the parts to be brazed not appreciably greater than such vapor pressure. As is well known in the art, it is necessary in any event that there be present no large concentration of gases, such as oxygen, which would react with the metal constituents of the parts to be brazed.

In the process of investigating further the art of aluminum brazing without flux, by the use of magnesium vapor, I undertook as a demonstrative experiment to place together a honeycomb structure of commercially pure aluminum, known as No. 1100 alloy and a braze sheet (known as No. 23 braze sheet) consisting of a base sheet of an alloy known as No. 6951 having on one side a thin coating of an alloy nominally 10 percent silicon by weight, remainder aluminum. The nominal composition of No. 6951 alloy is (by weight) 0.25 percent copper, 0.35 percent silicon, 0.65 percent magnesium, remainder aluminum. The braze sheet was placed with its silicon alloy coating uppermost, and the honeycomb structure of No. 1100 alloy was placed upon it. (The back or underside of the braze sheet was wrapped with a stainless steel foil.) The No. 1100 honeycomb and No. 23 braze sheet, heated in vacuo, would form a brazed joint, according to the teachings of my earlier application above referenced. However, I did not undertake to braze the parts in vacuo, but heated them in argon at atmospheric pressure. To achieve this, I first evacuated the furnace chamber in the conventional manner. I then admitted argon to the chamber to raise the pressure to atmospheric, and continued the flow of argon so it could sweep through the furnace chamber and out into the outside atmosphere, the purpose of this continuous flushing being to minimize the probability that any air would leak back into the furnace. When I heated the parts described to brazing temperature (1120° F.) under these conditions, I found that I obtained no filleted joint between the parts to be brazed together, although I observed evidence that the aluminum-silicon brazing alloy had indeed melted, but without forming a brazed joint. This is precisely what one would expect if one attempted to braze without a flux or some process for eliminating the need for a flux. I had expected such a result, since the pressure of the argon was so greatly in excess of the vapor pressure of the magnesium in the No. 6951 alloy.

It is a well known law of physical chemistry that, when a given constituent of an alloy composes only a certain atomic fraction of an alloy, the vapor pressure of that constituent at a given temperature will be not more than that same fraction of the vapor pressure of the pure constituent at the same temperature. Thus, for example, an alloy containing one atomic percent of magnesium will, at a given temperature, have a vapor pressure which is not more than one percent of the vapor pressure of pure magnesium at the same temperature. Consequently, the vapor pressure of magnesium produced by placing particles of pure magnesium in proximity to parts to be brazed will be greater than that produced by providing only an alloy containing other metals and only a part magnesium. But the vapor pressure even of pure magnesium at a normal aluminum brazing temperature, e.g., 1100 degrees F., will still be much less than one atmosphere, because the boiling point of magnesium (that is, the temperature at which its vapor pressure *is* one atmosphere) is 2,030 degrees F. Therefore it would not be expected that the use even of pure magnesium would be effective in a pressure of one atmosphere of ambient gas. In an attempt to demonstrate this supposed fact, I performed the following test, which was intended as a demonstrative experiment.

I placed a piece of commercially pure aluminum honeycomb known by the commercial designation No. 1100, upon a piece of braze sheet, commercial designation No. 11. This braze sheet is composed of a base sheet of alloy of high aluminum content, commercial designation No. 3003, having the following nominal composition by weight: 1.2 percent manganese, remainder aluminum, which base sheet has a coating or "cladding" of a lower melting brazing alloy or material having the following nominal composition by weight: 7.5 percent silicon, remainder aluminum. In accordance with usual practice, the cladding of brazing alloy was uppermost, so that it lay under the piece of No. 1100 material and above the base sheet of No. 3003 alloy upon which it was clad. The silicon alloy cladding of the braze sheet had previously been coated with particles of equal parts by weight of pure magnesium and of deoxidized copper powders applied as a suspension in methyl Cellosolve, a volatile liquid which merely served to facilitate application of a fairly uniform coating, and then evaporated. Having placed the piece of No. 1100 material in contact with the copper-and-magnesium-coated braze sheet as described, in the evacuable chamber, I evacuated the chamber and then filled it with argon, assuring that one atmosphere of pressure would be maintained in the chamber by bleeding a continuous flow of argon (about 13 cubic feet per hour) to the outside atmosphere. I then raised the temperature to 1135 degrees F., which is sufficient to melt the cladding of silicon alloy (which has a nominal melting range of 1070–1165 degrees F.), allowed the pieces to cool, and opened the furnace. I found that brazing had occurred, with formation of good fillets between the piece of No. 1100 material and braze sheet. Thus my attempt to perform a negatively resulting experiment resulted in a demonstration of the fluxless brazing of parts of high aluminum content in an atmosphere of gas at atmospheric pressure.

It is therefore a general object of my invention to braze parts of high aluminum content without flux, in an atmosphere of gas at appreciable pressure, including atmospheric pressure. The benefits resulting from achievement of this general object may be variously expressed and pointed out: for example, a furnace operating at atmospheric pressure, rather than vacuum, may be loaded and unloaded more rapidly; since heating of the parts may be accomplished by convection through the ambient gas, rather than exclusively by radiation and conduction (as in a vacuum furnace), the total brazing operation may be more rapid; elimination of vacuum pumps will reduce the cost of installations for brazing. From these facts (and others apparent to those skilled in the art, in the light of my disclosure) it is possible to formulate a variety of desirable objects which the practice of my invention achieves.

For the better understanding of my invention, I have provided figures of drawing, in which.

Figure 1:
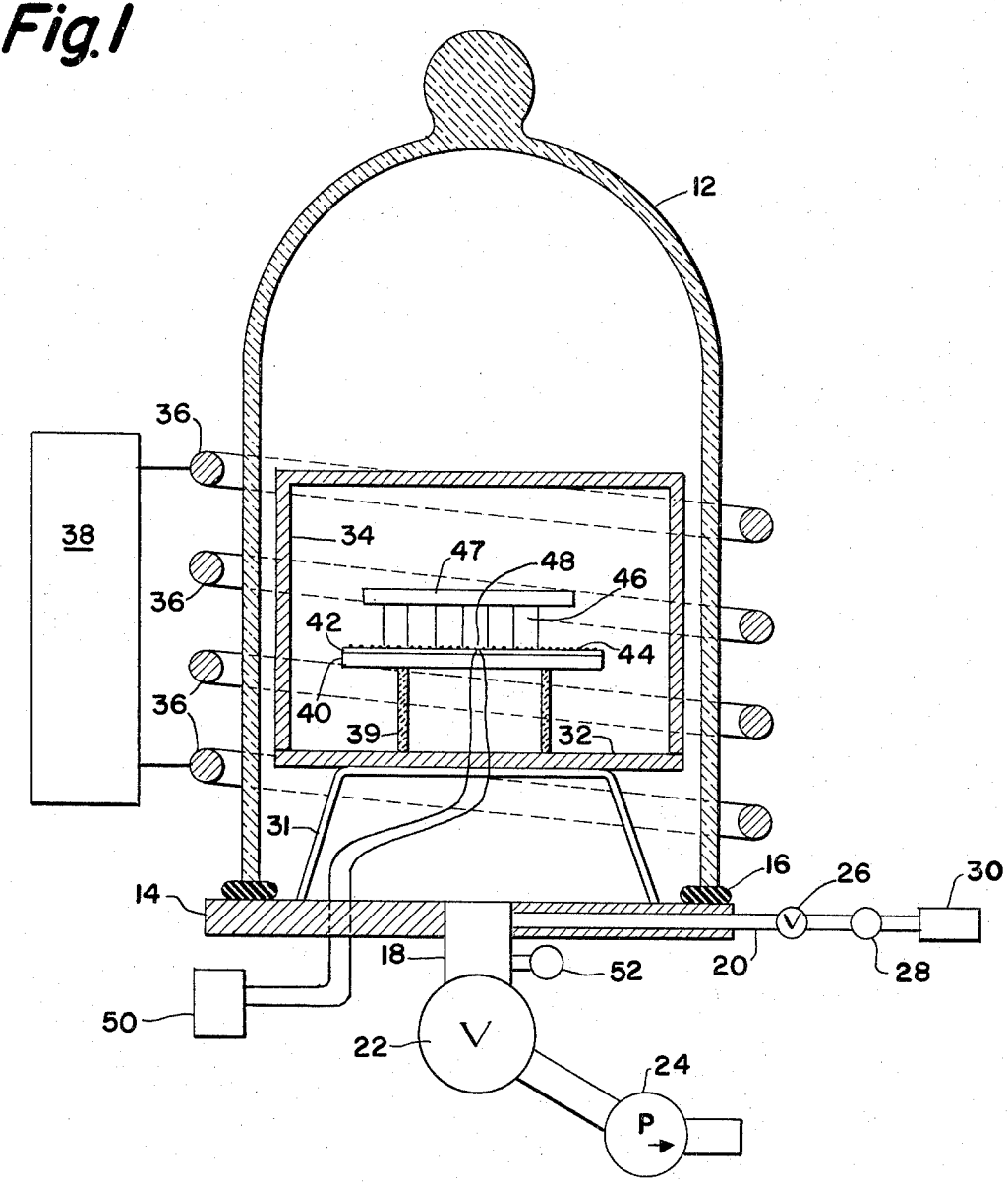
FIG. 1 represents schematically an arrangement of apparatus and work pieces suitable for the practice of my invention.

FIG. 1 represents, partly schematically, and partly by block diagram, a method of practicing my invention. A bell jar 12 is fitted hermetically to a floor plate 14 by an elastic gasket 16. A tube 18 leading through floor plate 14 is intersected by port 20. Tube 18 leads through valve 22 to vacuum pump 24. Port 20 leads through valve 26 and flow meter 28 to gas source 30. Inside bell jar 12 there is provided a tantalum support 31 on which there rests a tantalum mat plate 32, which is surmounted by tantalum can 34. A coupling coil 36 (represented in section), outside bell jar 12, connected to a radio-frequency generator 38, heats can 34 by conventional induction heating techniques. This has the advantage over direct induction into the samples to be brazed that samples of varying size and geometry placed within the can will be heated uniformly. Inside can 34, resting upon a ceramic support 39, there is represented a flat braze sheet consisting of a base sheet 40 with a thin coating or cladding 42 of brazing alloy or braze material, coated with powder 44. A honeycomb 46 to be brazed to the braze sheet beneath it is held in good mechanical contact with the braze sheet by the pressure of weight 47, which may be a piece of tantalum or stainless steel. A thermocouple 48 has its junction located in the immediate vicinity of the proposed joint, and is led through floor plate 14, through a hermetic seal, to a millivoltmeter, potentiometer, or other conventional pyrometric meter 50. A convenient type of vacuum gauge 52 is represented connected to the system by way of tube 18.

In operation, the various parts are assembled as indicated. Stopcock 26 is closed, pump 24 is started, stopcock 22 is opened. The system is evacuated. Since can 34 merely rests loose upon mat plate 32, the space within can 34 will also be evacuated. When bell jar 12 and its contents have been evacuated (which may be determined by observation of vacuum gauge 52, represented as connected to tube 18), stopcock 22 is closed and stopcock 26 is opened to admit gas from source 30 through flow meter 28. When bell jar 12 has been filled to atmospheric pressure with gas from source 30, a slight additional pressure will cause bell jar 12 to rise slightly from gasket 16 to permit a continuing flow of gas from source 30 to sweep through bell jar 12 and exit to the outer atmosphere. This procedure minimizes the likelihood of back leakage of air into bell jar 12. Radio frequency generator 38 is then started, heating can 34 (and mat plate 32) by induction from coil 36. The temperature of the pieces 40, 42, and 46 may be determined by pyrometric meter 50. The output of generator 38 is adjusted to bring the work up to the desired temperature; and when the desired temperature has been maintained for the desired time, generator 38 is shut off. The work is then allowed to cool. The flow of gas from source 30 is then stopped and, since the pressure inside bell jar 12 is already at atmosphere, bell jar 12 is lifted off plate 14, and can 34 is lifted, permitting removal of the brazed parts. If it is desired to braze in a vacuum, or at reduced pressure, instead of at atmospheric pressure, the same apparatus may be used by leaving stopcock 22 open at least partly, and (if a reduced pressure of gas from source 30 is desired rather than atmospheric pressure) admitting through stopcock 26 only enough gas from source 30 to maintain the desired subatmospheric pressure. Except for the particular materials used in the practice of my invention, the technique described is in accordance with conventional procedures in heating materials in controlled atmosphere at controlled pressure (or in vacuum).

Having described generally the apparatus represented in FIG. 1 and the procedures employed in its use, I give examples of results I have obtained in the practice of my invention.

EXAMPLE 1

I placed commercially pure aluminum (No. 1100) honeycomb upon the silicon-alloy layer (coated with magnesium-copper powder in equal weight proportions) of No. 11 braze sheet. These pieces I placed in can 34, in the apparatus as described in connection with FIG. 1, which was then evacuated, and then filled with argon to atmospheric pressure. I then initiated a flow of argon of about 13 cubic feet per hour to the atmosphere and maintained it while the temperature of the honeycomb and the braze sheet was raised to 1135 degrees F. The heating was then stopped, the parts were allowed to cool and, upon removing them from the apparatus I found them to be well brazed together.

By way of contrast, commercially pure aluminum (No. 1100) honeycomb was placed upon the silicon-alloy layer of No. 21 braze sheet without application of either copper or magnesium powder. The No. 21 braze sheet has a base of No. 6951 alloy, which contains magnesium and copper; under vacuum, No. 1100 aluminum may be brazed to No. 21 braze sheet without the addition of a coating of powder. However, when brazing was attempted as described in Example 1, with a flow of 13 cubic feet per hour of argon, at a temperature of 1137 degrees F., a braze was obtained only in spots. This result appeared consistent with the fact that the vapor pressure of magnesium from the alloy (which contained only a nominal 0.65 weight percent of magnesium) would be much less than that from the pure magnesium powder used in Example 1, and thus would be prevented to a considerable extent by the ambient argon from diffusing to the surfaces of the parts. The use of powdered magnesium, substantially pure, does permit brazing under the conditions described, as is evidenced by Example 2 immediately following.

EXAMPLE 2

I placed commercially pure aluminum (No. 1100) honeycomb upon the silicon-alloy layer of No. 21 braze sheet which had been coated with magnesium powder, without copper powder admixture. I placed these pieces on mat plate 32 and covered them with can 34, as I had done in Example 1, covered them with bell jar 12 on floor plate 14, and first evacuated the bell jar and then filled it to atmospheric pressure with argon. I then initiated a flow of argon of 13 cubic feet per hour and maintained it while I raised the temperature of the honeycomb and the braze sheet to 1138 degrees F. I then stopped the heating, allowing the parts to cool and, upon removing them from the apparatus I found them to be well brazed together.

Recapitulating briefly, in Example 2 I followed the procedure used in Example 1, but with the differences that in Example 2 I used No. 21 braze sheet, instead of No. 11 braze sheet as in Example 1; and in Example 2 I used only magnesium powder, instead of equal weights of magnesium and deoxidized copper powder as in Example 1.

EXAMPLE 3

I repeated all the procedures of Example 2, with the sole difference that I coated the silicon-alloy layer of the No. 21 braze sheet, not with magnesium powder alone, as in Example 2, but with a mixture of equal parts, by weight, of magnesium powder and deoxidized copper powder. I again obtained a good braze, but found that the back of the No. 21 braze sheet, away from the silicon alloy layer upon which the powders had been applied and at which the brazed joint had been formed, was somewhat eroded. This phenomenon is not uncommon when copper powder is used; I believe it results from diffusion of copper through the braze sheet, whose melting point it lowers locally, causing partial fusion of that portion of the sheet into which it diffuses.

I then repeated the procedures of Example 1, but used only deoxidized copper powder, with no magnesium. I obtained no brazing, but did find the back of the No. 11 braze sheet eroded.

To summarize my findings so far, I find that, operating at atmospheric pressure in argon, with No. 1100 commercially purse aluminum and a braze sheet and heating the parts to be brazed only up to brazing temperature and then allowing them to cool immediately:

No. 11 braze sheet, which contains no magnesium, will not braze except with the addition of magnesium powder, which causes it to braze well;

No. 21 braze sheet, which contains a small concentration of magnesium, brazes rather poorly with no added magnesium, but brazes well with added magnesium powder;

Copper powder alone does not produce brazing; it does produce some erosion of the braze sheet. However, in all of the tests the degree of erosion was not so great as to damage the braze sheet; and it has been my experience that the addition of copper with magnesium does improve filletting. This is probably because the addition of copper reduces the melting point of the alloy into which it enters.

Argon is usually regarded as a completely non-reactive gas, as are helium, neon, krypton, xenon, and radon. (Within the past few years, the formation of compounds of some of these so-called noble or inert gases has been reported, but only under very special conditions not of practical importance in the present connection.) Nitrogen, on the other hand, forms compounds with magnesium and aluminum, inter alia. But elemental nitrogen is rather difficult to cause to enter into chemical combination, and it is often used commercially, because of its cheapness, as an effectively inert atmosphere. I therefore undertook to investigate the effect of replacing argon by nitrogen.

EXAMPLE 4

I applied a mixture of equal weights of deoxidized copper powder and magnesium powder to the silicon-alloy coating of No. 11 braze sheet, placed a piece of No. 1100 commercially pure aluminum on the powdered surface, placed the parts thus assembled upon mat plate 32, covered them with can 34, placed bell jar 12 on floor plate 14, and evacuated the apparatus by the procedure previously described. I then admitted nitrogen to bring the interior of the jar to atmospheric pressure, and produced a flow of 13 cubic feet per hour of nitrogen through the bell jar in the manner previously described. I then heated the can 34 by induction until pyrometric meter 50 showed the piece inside had reached a temperature of 1136 degrees F. I then terminated the heating, allowed the pieces to cool, and, upon removing them from the apparatus, found a good brazed joint had been produced, similar to that obtained with these materials in argon.

EXAMPLE 5

I repeated the procedure of Example 4, but using only magnesium powder, without copper powder, and obtained a braze, although (consistently with my observations that copper promotes improved filletting when it is used in addition to magnesium) the filletted joints were not so good as those of Example 4.

Thus I demonstrated that it is not necessary to use a completely inactive gas in the practice of my invention, but only one which is effectively inactive toward the materials being used in the brazing process at the temperatures required for brazing. This latter distinction is not trivial; when magnesnium ribbon is burned in air, reaching a temperature much higher than is used in aluminum brazing, magnesium nitride is formed in addition to the magnesium oxide which is a necessary result of the combustion.

I have observed that the use of high pressures of inactive gases in the brazing operations described commonly produces, in the surface of the aluminum-silicon brazing material, a mottled or slightly pitted appearance, when magnesium powder is used. This appears to be consistent with the possibility that the ambient gas tends to impede the diffusion of magnesium vapor, tending to cause larger concentrations of magnesium vapor to be found around the particles of magnesium. This higher concentration of magnesium vapor (which would naturally be highest *under* a magnesium particle) may tend to produce a local region of higher magnesium content in the alloy, with lower melting point. The pitting is too small to be objectionable; it is of interest primarily because of its possible significance in permitting a visualization of events occuring during the process.

Figure 2:
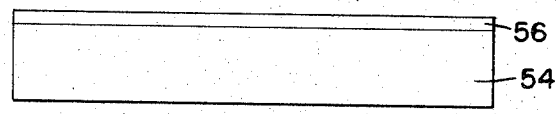
FIG. 2 represents a braze sheet clad on only one side with brazing material.
Figure 3:
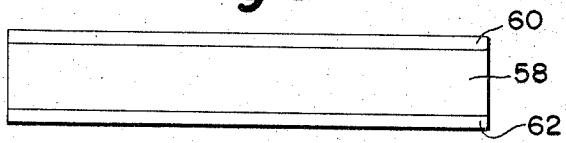
FIG. 3 represents a braze sheet clad on both sides with brazing material.

To insure against any possible misunderstanding of the nature of a clad braze sheet, I have represented by FIG. 2 a braze sheet clad on only one side. The base material 54 is the basic structural material, and may be of any aluminum alloy of suitable properties; it is clad on its upper surface only with aluminum brazing material or alloy 56, conventionally an aluminum alloy of perhaps five to ten percent of silicon content by weight. Such a brazing sheet is suitable for brazing of aluminum alloy parts to its upper surface. FIG. 3 represents a braze sheet clad on both sides. In this the base material 58 is chosen primarily for its desired mechanical properties, as was 54 of FIG. 2; and the top and bottom are clad with aluminum brazing material in layers 60 and 62, of the same composition as is suitable for 56 of FIG. 2. The braze (or brazing) sheet represented in FIG. 3 is suitable when aluminum alloy parts are to be brazed to both sides of the braze sheet.

My disclosure thus far is, briefly, that the presence of high concentration of magnesium permits fluxless brazing in inert gas at pressures at least up to atmospheric by heating the parts up to the brazing temperature and immediately allowing them to cool. By further investigation, I found that brazing without flux is possible when reduced concentrations of magnesium are present in alloys, providing that the parts are maintained at brazing temperature for an appreciable time, of the order of five minutes for parts of moderate size. Apparently the lower vapor pressure of magnesium resulting from the reduced concentration of magnesium is compensated by allowing a longer time for the magnesium vapor to diffuse to the surfaces to be joined.

EXAMPLE 6

Following the general procedure described immediately after Example 1, commercially pure aluminum (No. 1100) was placed in contact with silicon-alloy coated No. 21 braze sheet, whose base is composed of No. 6951 alloy, having a content of magnesium and copper. This was heated in an atmosphere of flowing argon at atmospheric pressure to a temperature of 1135° F., and held at that temperature for ten minutes. Upon cooling, a good brazed joint was found. Repetition of this test for various periods indicated that times varying from three to ten minutes were satisfactory.

By use of the No. 21 braze sheet, which is coated with 7.5 percent silicon alloy on one side, and of a No. 23 braze sheet, which is of the same base alloy (No. 6951) but clad with 10 percent silicon alloy, brazed joints were made to commercially pure aluminum alloy (No. 1100) and to No. 3003 alloy, nominal composition 1.2 percent manganese, remainder aluminum. Braze sheet No. 12 of 7.5 percent silicon alloy coated on a base of composition 1.2 percent manganese, remainder aluminum, was also brazed to No. 21 and No. 23 braze sheets.

Figure 4:
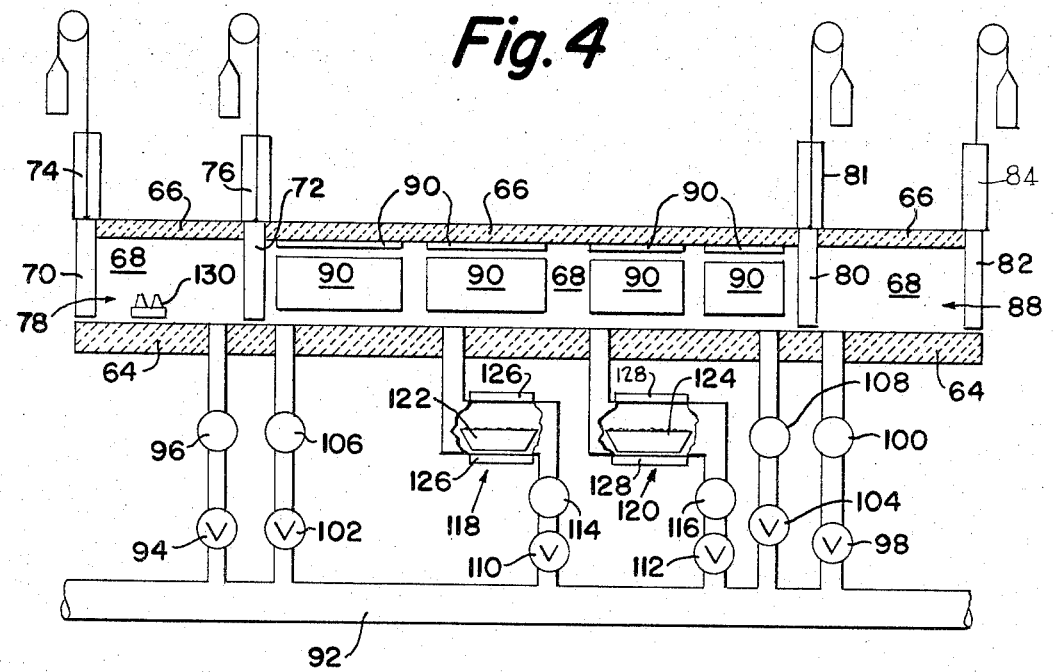
FIG. 4 represents an alternative arrangement of apparatus suitable for the practice of my invention, especially useful for large-scale operations.

It is my belief, although I have not conducted such exhaustive tests as are necessary to render it a scientific certainty, that the limitations upon this process are those determined rather by practical considerations than by theory. Thus, the minimum concentration of magnesium in an alloy which will be effective for my purposes will be limited in the first instance by the presence of casual impurities which may tend to restore a film of oxide or other non-brazable films upon the surfaces of the parts to be brazed. Since perfect purity in any gas is not known to exist, it is clear that even the purest commercially available gas will contain some oxidants which will set a lower limit to the permissible concentrations of metallic magnesium, if nothing else does. Even if completely pure gas were obtainable and if every trace of oxidant or other reactant could be kept out of the gas and out of the chamber in which the brazing is conducted, nevertheless there would be a practical limitation in time in the concentration of metallic magnesium which would be useable. Conceivably under the conditions which I have hypothesized a concentration of $10^{-8}$ or $10^{-9}$ of magnesium in an alloy might suffice for the conduct of the process if a sufficiently long time were permitted. It appears very likely that to operate with such a low concentration the period of some hours might be required for the conduct of the brazing operation and the consumption of time would be highly uneconomical since there would be no corresponding benefit to the use of such an extremely low concentration of magnesium, magnesium being a well-known and widely-used alloying element in aluminum alloys and, in reasonable concentrations, having no objectionable characteristics whatever. It may be appropriate to point out that the surprising nature of my invention is hereby rendered the more evident, in that magnesium-bearing aluminum alloys suitable for the practice of my invention have been commercially available for many years and yet the prior art has been confined, so far as I am aware, to other methods of brazing requiring flux which because of its corrosive nature and because it constitutes, in any event, an impurity, is objectionable:

It is possible that particular shapes or parts may not be readily available in a magnesium-bearing alloy; and that the application of magnesium powder may not be convenient. I have therefore disclosed in FIG. 4 a furnace suitable for continuous operation, in which magnesium vapor is provided separately and introduced into the heated region of the furnace with the inert gas. In FIG. 4, which is partly sectional, there is represented a furnace having a floor 64, a roof 66 (both sectioned by a central plane parallel to the plane of the figure), and walls 68. Counter balanced doors 70 and 72, which move in guides 74 and 76, divide the left end of the furnace into a lock 78. Similarly, doors 80 and 82, moving vertically in guides 81 and 84, divide the right-hand end of the furnace into a lock 88. Electric heating elements 90 are conventionally represented as rectangles fastened to the walls 68 and roof 66 of the heated central portion of the furnace. Their details, and their connection to a source of power, being completely conventional, are not represented, in order to leave the drawing easier to read. An inert gas header 92 (connected to a gas source not shown) is connected through valve 94 and flow meter 96 to ports in the floor 64 which lead into lock 78. Similarly, header 92 is connected via valve 98 and flow meter 100 to ports leading through floor 64 to the interior of lock 88. Valves 102 and 104 connect header 92 via flow meters 106 and 108, respectively, to ports in floor 64 leading to the opposite ends of the heated central chamber of the furnace. Also connected to inert gas header 92 are valves 110 and 112, which lead through flow meters 114 and 116, respectively, to magnesium vaporizing chambers 118 and 120, respectively, which are represented partly cut away to show containers 122 and 124 containing magnesium powder or filings. Vaporizing chambers 118 and 120 are represented surrounded by electrical heaters 126 and 128, respectively, whose construction details and connection to a power source are not shown, as being completely conventional.

The mode of operation of the furnace is as follows: Initially, the furnace will be filled with air, and must be purged with a large flow of inert gas from header 92. This may be accomplished by partly raising doors 70, 72, 80, and 82, and opening valves 94, 98, 102, 104, 110, and 112 to produce a rapid flow of inert gas into the furnace, and out through the ends. After flushing adequate to remove the air, the doors 70, 72, 80, and 82 may be lowered. It has been tacitly assumed that the leakage past the doors, even in their closed condition, will be sufficient to afford adequate venting of the flowing inert gas. If this is not true, small vents may be provided in or adjacent to the doors. Valves 94, 102, 104, and 98 may be partially closed to prevent unnecessarily large flow of gas; all that is required is enough to sweep backward any air tending to leak in at any entrance. Valves 110 and 112 may conveniently be completely closed. Energy is now fed to heaters 90, to bring the furnace up to brazing temperature, and to heaters 126 and 128 to raise the magnesium to a temperature at which it will produce sufficient vapor. As the temperature raises, valves 110 and 112 may be opened a little at a time until the inert gas flow is increased to a value (as determined by flow meters 114 and 116) sufficient to blow an adequate supply of magnesium vapor into the central chamber of the furnace. It may be observed that the gas entering vaporizing chambers 118 and 120 from header 92 will tend to chill the magnesium. In a given design, it may be found preferable to provide preheaters of conventional design between flow meters 114 and 116 and chambers 118 and 120, respectively. If the temperature of the gas entering chambers 118 and 120 is maintained near the temperature of the magnesium, control of the energy input to heaters 126 and 128 will be less critical as a function of gas flow.

Given, now, that equilibrium at the desired temperatures has been achieved, valve 94 is opened wide, door 70 is raised, and an assembly to be brazed, 130 is inserted into lock 78. Assembly 130 may, depending upon the nature of the particular parts involved, rest upon a carriage such as a boat of stainless steel. Door 70 is now closed, valve 94 may be adjusted to reduce flow indicated by flow meter 96 to the value normal when the furnace is closed, and door 72 is raised. Assembly 130 is slid into the central heated chamber of the furnace. No conveying means have been shown in the furnace. Moving belts of stainless steel chains running through the furnace are a completely conventional solution to the problem of moving loads through tunnel or tubular furnaces. However, the simplified structure shown here may be operated by sliding a rod under the various doors, and pushing the load through the furnace.

Assembly 130, in the furnace here represented, need consist only of a brazable combination of parts, e.g., No. 11 braze sheet with No. 1100 aluminum parts in contact with the silicon-alloy coating on the braze sheet, but without especially added magnesium. When assembly 130 is located in the hot zone of the furnace chamber, it will be adjacent to the ports connecting to magnesium vaporization chambers 118 and 120. By suitably adjusting valves 110 and 112 to produce sufficient flow of inert gas, and maintaining the temperature of the magnesium in chambers 118 and 120 sufficiently high to produce a sufficiency of magnesium vapor, the parts to be brazed may be exposed to magnesium vapor swept into the furnace by flow of inert gas through the chambers and thence through the ports into the furnace. This magnesium vapor will, in accordance with my disclosures above, eliminate the need for conventional flux, and will permit the fluxless brazing of the parts in assembly 130.

After completion of the brazing operation, door 80 may be raised, and assembly 130, now brazed, may be moved into lock 83. It may be left in lock 88 long enough to cool. Door 80 may be lowered, valve 98 may be opened wide to produce a large flow of inert gas from header 92 into lock 88, and door 82 may be raised, permitting removal of the completely brazed assembly 130.

It is, of course, evident that a continual movement of assemblies like 130 may be maintained through the furnace, with automatic transportation of assemblies through the furnace, and automatic control of the lock doors and flow of inert gas. A basic requirement is that these operations be all so synchronized that there is no leakage of air into the furnace (which would oxidize the hot parts); and the movement of the assemblies through the furnace should be sufficiently slow that they are raised to brazing temperature and maintained there sufficiently long for brazing to occur. Exact dimensions and heating times are, of course, controlled by the size and mass of the parts to be brazed, and are part of the known art of brazing furnace design, requiring determination in each individual case in accordance with the teachings of that art.

As a matter of convenience, it will ordinarily be preferable to use fairly pure magnesium (e.g., over ninety percent purity) as a source of the vapor; but it may be seen that it is possible, for example in the apparatus represented in FIG. 4 to use magnesium of low purity and obtain a sufficient supply of vapor by running chambers 118 and 120 at a higher temperature than would be required with pure magnesium; and such operation would be fully equivalent to the use of high purity magnesium. Ordinarily, this would not be preferred since it places greater requirements upon heaters 126 and 128.

While not necessary to disclosure of my invention, it appears desirable to point out that any accumulations of excess magnesium metal in the furnace may be readily oxidized by operating the furnace without any flow of inert gas. Atmospheric oxygen will then oxidize the magnesium metal to magnesium oxide which is a friable or soft powder readily rodded loose and swept out. Magnesium and its compounds are, of course, well known to be nontoxic, although magnesium hydroxide and certain magnesium salts have physiological effects utilized in medicine.

To recapitulate my invention, I have taught the method of brazing together parts of high metallic aluminum content, in the absence of flux, in the presence of an inert gas. The parts thus described include those made of the usual aluminum alloys in which aluminum is the predominating constituent and the other constituents are regarded simply as elements alloying the aluminum. The inert gas has simply the general characteristics that it is inert to the parts to be brazed, to the aluminum brazing material required to form the joint, and to metallic magnesium and its vapor, at the brazing temperature. Such gases include the inert gases of the atmosphere and nitrogen but any gas having the specified characteristics will function in the invention. The brazing material which is required to be placed at the interfaces between the parts to be joined is conventionally an aluminum silicon alloy. The parts assembled in their desired relationship, with aluminum brazing material at the interfaces between them where a brazed joint is to be produced, are surrounded with the inert gas and are heated to a brazing temperature which is higher than the melting temperature of the brazing material and, for obvious reasons, must be lower than the melting temperature of any of the parts. Magnesium vapor is then provided in the vicinity of the interfaces. This may be done by placing metallic magnesium, either pure or alloyed, in the vicinity of the interfaces so that it is heated when the parts are heated and yields vapor, it may also be provided by placing a source of metalic magnesium in a separate container and heating the container to a second temperature which may differ from the brazing temperature so that magnesium vapor is produced; this magnesium vapor is then swept toward the interfaces by the passage of inert gas. As I have demonstrated in the foregoing specification, this process is operative at gas pressures in excess of one atmosphere; but, particularly when the metallic magnesium is in a dilute form, as in an alloy, it is necesary to maintain the assembled parts at the brazing temperature for a time sufficient for the magnesium vapor to act to permit the molten brazen material to wet and join the parts at their interfaces. I have found, as is recorded in the present specification, that simply assembling the parts with brazing material at the interfaces between them and heating them in an inert atmosphere in the absence of magnesium does not produce a brazed joint. It is thus evident that, although I have no sure evidence of the specific mechanism by which the magnesium operates, its function here is to permit the molten brazing material to wet and join the parts at their interfaces.

I claim:

1. The method of brazing together without flux parts of high metallic aluminum content which comprises:
   (a) assembling the parts in their desired relationship, with an aluminum brazing material having a melting temperature lower than that of any part present at the interfaces between the parts where a brazed joint is to be produced;
   (b) surrounding the parts with a gas at a pressure of at least one atmosphere, inert to the said parts and to the said aluminum brazing material and to metallic magnesium and its vapor at a temperature higher than the melting temperature of the said aluminum brazing material;
   (c) heating the assembled parts and brazing material to a brazing temperature higher than the melting temperature of the brazing material and lower than the melting temperature of the parts;
   (d) providing magnesium vapor in the vicinity of the said interfaces;
   (e) maintaining the assembled parts at the said brazing temperature for a time sufficient for magnesium vapor to permit the molten brazing material to wet and join the said parts at the said interfaces;
   (f) cooling the assembled parts below the solidification temperature of the brazing material.

2. The method in claim 1 in which the said aluminum brazing material is an alloy comprising silicon and aluminum.

3. The method claimed in claim 1 in which the said inert gas comprises a noble gas.

4. The method claimed in claim 1 in which the said inert gas comprises nitrogen.

5. The method claimed in claim 1 in which the said magnesium vapor is provided by placing substantially pure metallic magnesium in the vicinity of the said interfaces.

6. The method claimed in claim 1 in which the said magnesium vapor is provided by placing an alloy containing metallic magnesium in the vicinity of the said interfaces.

7. The method claimed in claim 1 in which the said magnesium vapor is provided by metallic magnesium incorporated in at least one of the said parts of high metallic aluminum content.

8. The method claimed in claim 1 in which the said magnesium vapor is provided by:
 (a) placing material comprising magnesium in a separate container;
 (b) heating the said container and its contents to produce magnesium vapor;
 (c) passing inert gas over the said container and thence to the said interfaces to sweep the said magnesium vapor toward the said interfaces.

9. The method claimed in claim 1 in which:
 (a) the said time is at least three minutes.

References Cited

UNITED STATES PATENTS

| | | | |
|---|---|---|---|
| 2,907,105 | 10/1959 | Ohmi | 29—504 X |
| 2,916,815 | 12/1959 | Donkervoort | 29—504 |
| 2,987,816 | 6/1961 | Noland | 29—501 X |
| 3,063,145 | 11/1962 | Bouton | 29—503 X |
| 3,081,534 | 3/1963 | Bredzs | 29—494 |
| 3,083,452 | 4/1963 | Terrill | 29—498 X |
| 3,091,846 | 6/1963 | Henry | 29—494 X |
| 3,133,348 | 5/1964 | Cape | 29—494 |
| 3,180,022 | 4/1965 | Briggs | 29—504 X |
| 3,235,959 | 2/1966 | Bartoszak | 29—504 X |
| 3,321,828 | 5/1967 | Miller | 29—488 |
| 3,322,517 | 5/1967 | Miller | 29—197.5 |

OTHER REFERENCES

NASA tech. brief, 66–10360, Aluminum Core Structures Brazed Without Use of Flux, August 1966.

JOHN F. CAMPBELL, *Primary Examiner.*

D. F. DROPKIN, *Assistant Examiner.*